(12) United States Patent
Bodensteiner et al.

(10) Patent No.: US 8,475,307 B2
(45) Date of Patent: Jul. 2, 2013

(54) TENSIONING RAIL FOR A CHAIN DRIVE WITH A BRIDGING GUIDE CHANNEL SECTION AS A PRESSING REGION

(75) Inventors: Martin Bodensteiner, München (DE); Sandra Ketterl, Moosinning (DE); Artur Preis, Germering (DE); Michael Weikert, Neufinsing (DE)

(73) Assignee: iwis motorsysteme GmbH & Co. KG, Munich (DE)

( * ) Notice: Subject to any disclaimer, the term of this patent is extended or adjusted under 35 U.S.C. 154(b) by 464 days.

(21) Appl. No.: 12/438,166

(22) PCT Filed: May 16, 2007

(86) PCT No.: PCT/EP2007/004405
§ 371 (c)(1),
(2), (4) Date: Apr. 9, 2009

(87) PCT Pub. No.: WO2008/022663
PCT Pub. Date: Feb. 28, 2008

(65) Prior Publication Data
US 2009/0197723 A1 Aug. 6, 2009

(30) Foreign Application Priority Data

Aug. 23, 2006 (DE) .......................... 20 2006 012966

(51) Int. Cl.
*F16H 7/08* (2006.01)
(52) U.S. Cl.
USPC .......................................... 474/111; 474/110

(58) Field of Classification Search
USPC ............... 474/101, 110, 111, 140; 123/90.27, 123/90.31, 192.1
See application file for complete search history.

(56) References Cited

U.S. PATENT DOCUMENTS

| | | | | |
|---|---|---|---|---|
| 952,647 | A | * | 3/1910 | Sorenson ...................... 474/145 |
| 2,261,316 | A | * | 11/1941 | Weller .......................... 474/111 |
| 4,177,689 | A | * | 12/1979 | Zeilinger et al. ................ 474/87 |
| 4,530,681 | A | | 7/1985 | Kurata et al. |
| 4,553,509 | A | * | 11/1985 | Mezger et al. ............. 123/90.27 |
| 4,741,299 | A | | 5/1988 | Matsuura et al. |
| 5,690,569 | A | * | 11/1997 | Ledvina et al. ............... 474/111 |
| 5,776,024 | A | * | 7/1998 | White et al. ................... 474/110 |
| 7,033,295 | B2 | * | 4/2006 | Garbagnati et al. .......... 474/110 |
| 2002/0132688 | A1 | * | 9/2002 | Ono ............................. 474/111 |
| 2003/0040385 | A1 | * | 2/2003 | Konno .......................... 474/111 |
| 2003/0228948 | A1 | * | 12/2003 | Garbagnati et al. .......... 474/110 |
| 2005/0277505 | A1 | * | 12/2005 | Wong et al. ................... 474/111 |
| 2006/0234819 | A1 | * | 10/2006 | Markley et al. ............... 474/111 |
| 2006/0247080 | A1 | * | 11/2006 | Wigsten et al. ............... 474/111 |

(Continued)

FOREIGN PATENT DOCUMENTS

DE  43 41 019 A1  6/1995
DE  197 13 824 A1  10/1997

(Continued)

*Primary Examiner* — Thomas B Will
*Assistant Examiner* — Mai Nguyen
(74) *Attorney, Agent, or Firm* — Leydig, Voit & Mayer, Ltd.

(57) ABSTRACT

The invention relates to a tensioning rail for a chain drive with a support body which is pivotable about a center of rotation and which has a guide channel, which can be placed in contact with a chain, and a pressing region which can be acted on with pressure by a tensioning piston, wherein the pressing region bridges the guide channel at least in regions by forming a peripherally closed guide channel section, wherein the pressing region is formed in one piece with the support body.

19 Claims, 2 Drawing Sheets

FOREIGN PATENT DOCUMENTS

Figure 1:
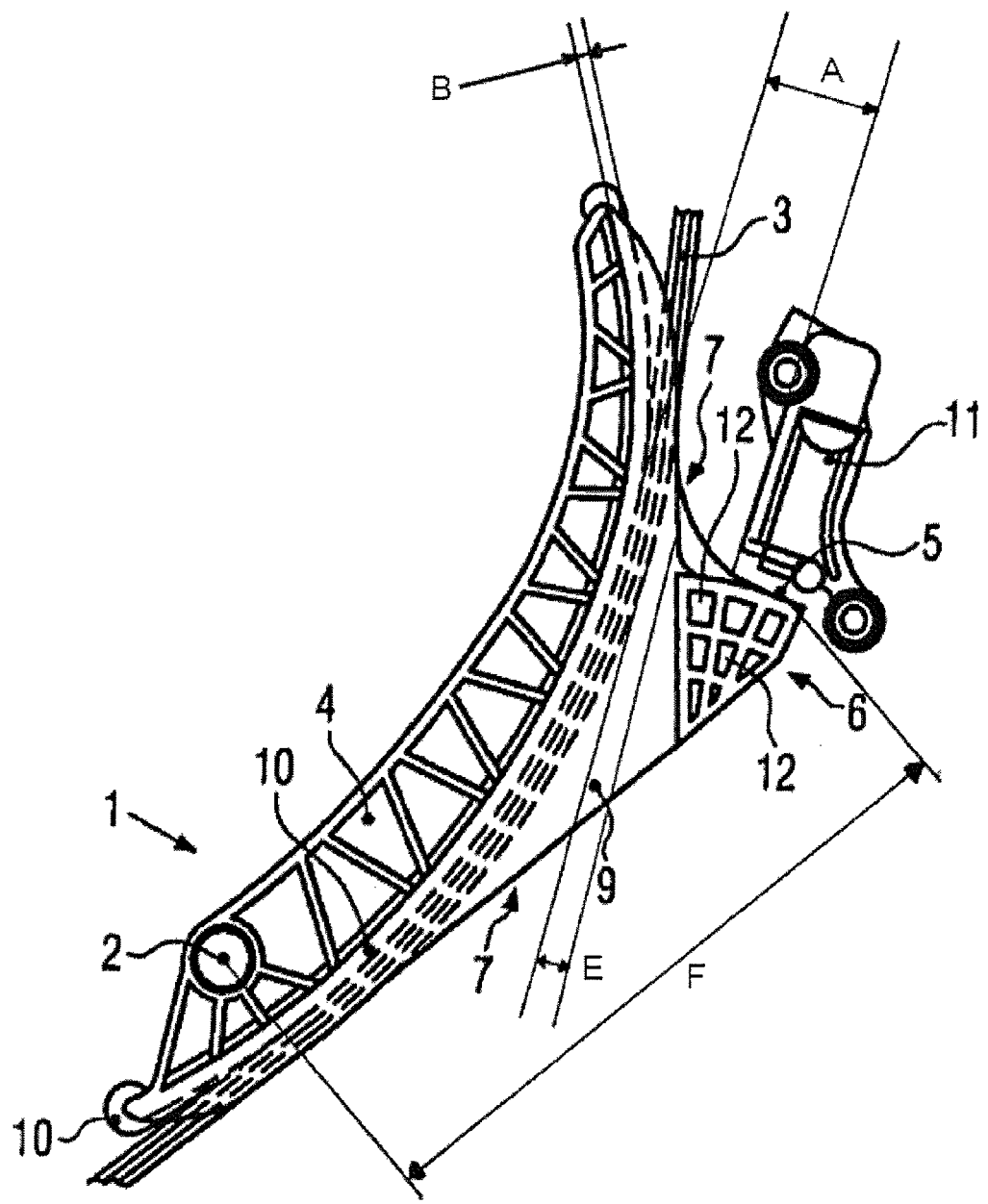

| | | |
|---|---|---|
| DE | 102 47 419 A1 | 4/2004 |
| DE | 20 2004 013 921 U1 | 1/2006 |
| EP | 1 369 621 A2 | 12/2003 |
| JP | 2000193051 A | 7/2000 |
| JP | 2005-106147 A | 4/2005 |
| WO | WO2006015483 * | 2/2006 |

* cited by examiner

TENSIONING RAIL FOR A CHAIN DRIVE WITH A BRIDGING GUIDE CHANNEL SECTION AS A PRESSING REGION

The present invention relates to a tensioning rail for a chain drive with a support body which is pivotable about a center of rotation and which has a guide channel, which can be placed in contact with a chain, and a pressing region which can be acted on with pressure by a tensioning piston, the pressing region bridging the guide channel at least in regions by forming a peripherally closed guide channel section.

The prior art discloses tensioning rails with attached pressing region. DE 202004013921 U1 discloses a tensioning rail for a chain drive, with the tensioning rail comprising a guide channel. The guide channel is here configured to be open in such a way that a chain can be easily guided past the two flanks of the tensioning rail facing each other and is in contact with a slide lining body provided on the bottom side of the guide channel. A pressure piece with a pressing region is clipped in DE 202004013921 U1 onto the two flanks of the guide channel, so that the pressure piece bridges the guide channel. A tensioning piston presses onto the pressing region.

Tensioning rails are used in chain drives, particularly in timing chain drives, for internal combustion engines. The timing chains interconnect crankshafts and camshafts. To give the timing chains enough tension so as to prevent the chain from slipping off of gears, which are mounted on the camshaft and the crankshaft, the timing chain is tensioned via a tensioning rail. Tensioning rails have very different shapes. In the present case tensioning rails are concerned that have a guide channel for the timing chain arranged between the pressing region and a center of rotation about which the tensioning rail pivots during the tensioning operation.

Tensioning rails are for example known from U.S. Pat. No. 4,741,299, DE 4341019 A1, DE 19713824 A1, U.S. Pat. No. 4,530,681 and Japanese publication JP 2005/105147 A. The known tensioning rails, however, have drawbacks in terms of force application and force absorption as today's known tensioning rails cannot be made very sturdy. Furthermore, after assembly of the tensioning rail in the engine an additional component must be mounted on the tensioning rail to form a contact surface for a tensioning piston so that through the introduction of pressure applied by the tensioning piston to the pressing region of the tensioning rail the tensioning rail can be pivoted and the desired tension is achieved in the timing chain.

It is the object of the present invention to avoid the drawbacks known from the prior art.

A generic solution of the object is that the pressing region is formed in one piece with the support body. A one-piece design means that both the pressing region and the remaining region of the tensioning rail are made of one single component. This encompasses both an integral bond and the presence of one and the same material in the tensioning rail, particularly in the pressing region and also in the remaining component of the tensioning rail. With a configuration according to the invention the tensioning rail becomes more resilient. It can better cope with an increased chain tension from the tensioning rail, and an increased pressure can also be exerted via the pressing region through the tensioning piston on the timing chain. Due to the configuration according to the invention, a subassembly consisting of tensioning rail with pressing region and the chain threaded into the tensioning rail can be installed in the engine. This novel tensioning rail replaces conventional tensioning rails and conventional separate pressure pieces. A preassembly of timing chain and tensioning rail of the invention is favourable. Assembly times are reduced and costs are thereby saved. The application of force to the rail takes place via an integral component. In contrast to the formerly known two-part solutions, tolerances need not be matched for obtaining a connection without play. Advantageously, there will be no play between the pressing region and the tensioning rail body throughout the whole service life. The many possible designs for injection molded parts and die castings are maintained, thereby taking into account the engine requirements. Specifically, a guide channel is extrudable through which the open timing chain can be threaded. After the subassembly composed of tensioning rail and timing chain has been inserted, the timing chain is closed and subsequently tensioned via the tensioning piston.

Advantageous developments will now be described in more detail and claimed in the subclaims.

It is of particular advantage when the pressing region is arranged in the half that is remote from the center of rotation, preferably in the third that is remote from the center of rotation, of the tensioning rail. The pressures acting on the timing chain, which are introduced via the tensioning piston, are appropriately great for achieving the necessary chain tension that guarantees that the timing chain will not come off from the chain sprockets on crankshaft and camshaft. As a consequence, the tensioning rail needs less maintenance, and engine operation is more failsafe. To prevent torsions in the tensioning rail, it is of advantage when the pressing region is reinforced for pressure absorption in a further embodiment.

In a further advantageous embodiment the pressing region can be produced and is reachable by the tensioning piston in a particularly easy way when the pressing region is configured as a projection of the tensioning rail.

The pressures introduced by the tensioning piston can then be distributed particularly easily in the tensioning rail without the consequence that the pressing region will break off when the projection comprises recesses on its sidewall oriented in parallel with a plane in which the chain is running.

When the recesses are provided in a pressure-optimized way in the direction of pressure application by the tensioning piston, the special force paths upon occurrence of pressure in the tensioning rail will be distributed particularly well in this embodiment.

To minimize wear in the guide channel, it has turned out to be advantageous when a slide lining body, on which the chain is slidable, is arranged in the guide channel in a further embodiment.

When the slide lining body is clipped onto the ends of the tensioning rail, the slide lining body can be mounted particularly rapidly and easily on the tensioning rail. This will further reduce the costs.

Particularly installation-friendly geometric values are obtained in a further advantageous embodiment when the shortest distance, A, as shown in FIG. 1, of the end of the pressing region at the tensioning piston side from the slide lining body surface is about ⅛ to ⅜ the distance, F, as shown in FIG. 1, of the end of the pressing region at the tensioning piston side from the center of rotation, preferably ¼.

When the shortest distance, A, of the end of the pressing region at the tensioning piston side from the slide lining body surface is between about six and eight times the thickness of the slide lining body, B, as shown in FIG. 1, preferably seven times, a further advantageous embodiment is obtained. The cross section of the guide channel is then large enough that a timing chain, spaced apart with the necessary play, is running through the tensioning rail while keeping the dimensions as small as possible to permit installation of such a tensioning rail according to the invention in as many engines as possible.

Figure 3:
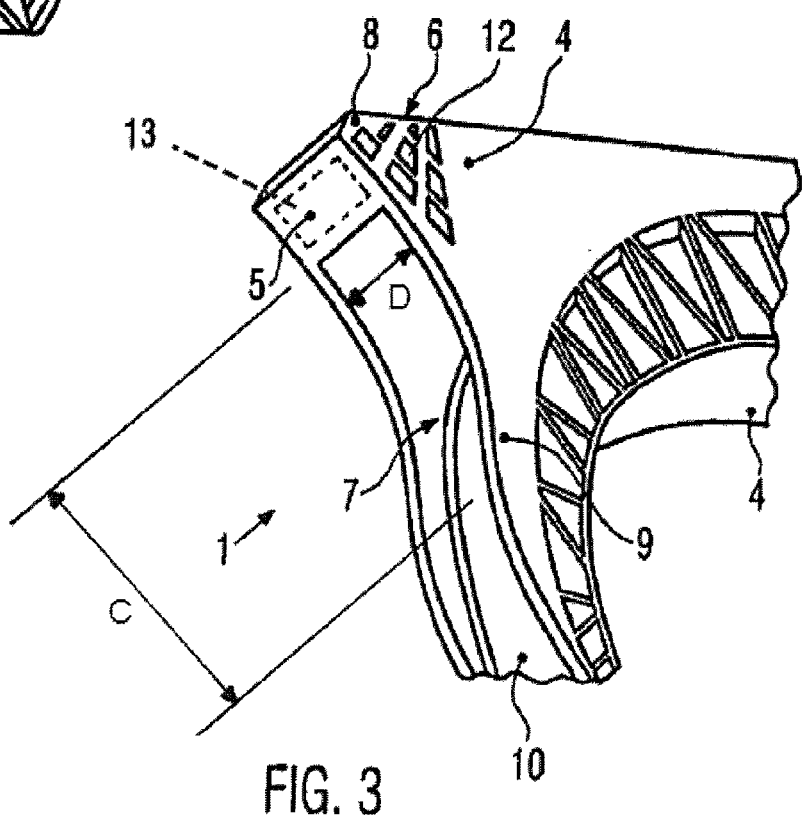

When the height, C, as shown in FIG. 3, of the guide channel in the area of the closed guide channel section is between 1.2 and 2.1 times, preferably 1.8 times, the width, D, as shown in FIG. 3, of the guide channel, a particularly optimized width/height ratio of the tensioning rail will ensue.

To prevent contact of the timing chain with the tensioning rail on a guide channel edge without slide lining, i.e. approximately in the pressing region, it is particularly positive in a further advantageous embodiment when a distance, E, as shown in FIG. 1, of about 0.2 to 1.0 of the guide channel width D exists between the upper side of a chain insertable into the guide channel, which upper side is remote from the slide lining body surface, and the bottom side of the guide channel section bridging the guide channel, which bottom side is close to the slide lining body surface.

A particularly advantageous tensioning rail is found in a further advantageous embodiment when the pressing region comprises a steel plating 13, as shown in FIG. 3, which is firmly connected in one piece with the support body. When such a steel plating is provided on the outside of the projection in the area of the pressing region on the surface thereof, the wear resistance of the tensioning rail will be increased because impacts of the piston pressing onto the pressing region can be compensated with less wear. Other metal inserts can however be introduced as well.

Figure 2:
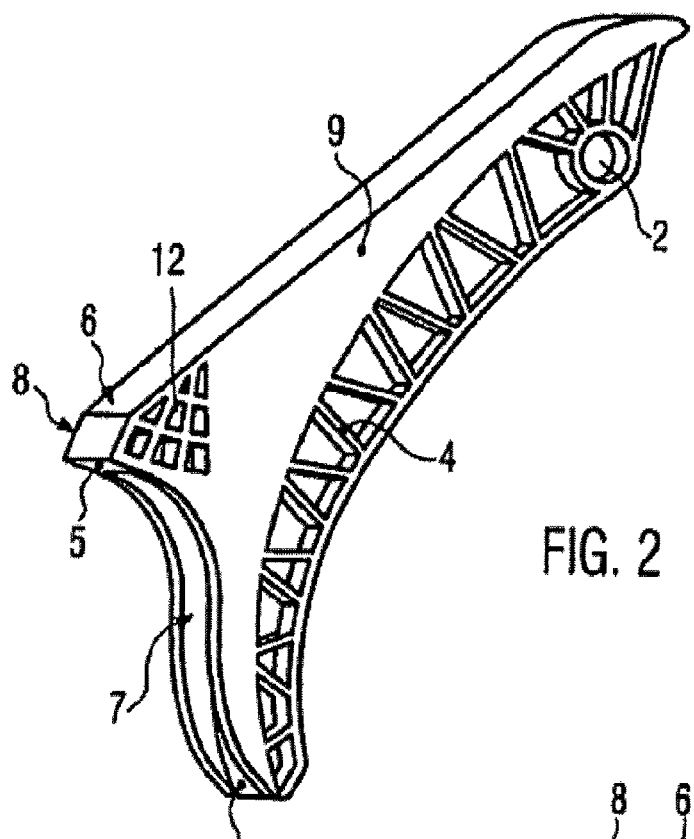

An embodiment shall now be explained in the following with reference to a drawing, in which FIG. 1 is a schematic top view on a tensioning rail with an outlined tensioning chain and a tensioning piston pressing onto a pressing region of the tensioning rail;

FIG. 2 is an isolated perspective view of the tensioning rail according to the tensioning rail of FIG. 1; and FIG. 3 is a perspective detail view of the pressing region of the tensioning rail of FIGS. 1 and 2.

FIG. 1 shows a tensioning rail 1 of extrudable material. The tensioning rail 1 has a center of rotation 2. The tensioning rail 1 is made convex at the timing chain side. At the side remote from the timing chain the tensioning rail 1 is made concave. In FIG. 1 the timing chain is provided with reference numeral 3. The tensioning rail comprises a support body 4 on which a pressing region 5 is formed. The pressing region 5 is part of a projection 6. The timing chain 3 extends between the center of rotation 2 and the pressing region 5 of the projection 6. The pressing region 5 is made in one piece from the same material as the support body 4 of the tensioning rail 1. The tensioning rail 1 is manufactured in an injection molding process. The pressing region 5 of the projection 6 forms a region bridging the timing chain 3. While the timing chain 3 is running in a guide channel 7, said region bridges the guide channel 7. Said region is called guide channel section 8. The center of rotation 2 is the center of a slide bushing which is incorporated into the tensioning rail 1, namely into the support body 4. The guide channel 7 may have any U-shaped or even L-shaped configuration.

The support body 4 is configured such that it comprises two spaced-apart webs 9 along a convexly bent surface. The webs 9 of the support body 4 pass at both sides of the timing chain 3 extending thereinbetween into the projection 6 which shapes the pressing region 5.

In the area of the projection 6, particularly in the pressing region 5, the webs 9 of the support body 4, while being interconnected, bridge the timing chain 3. In the opened state the timing chain 3 must be threaded through the guide channel 7 and underneath the guide channel of the section 8. A slide lining body 10 is clipped onto the side of the center of rotation of the guide channel 7. The slide lining body 10 is equipped at both ends with projections that are clipped onto the ends of the support body 4 of the tensioning rail 1. When the timing chain 3 is inserted into the guide channel 7, it slides in the operative state on the surface of the slide lining body 10. A tensioning piston 11 is fastened at the engine side and presses with a movable cylinder onto the pressing region 5. When the tensioning piston 11 presses onto the pressing region 5 to an increased degree, the support body 4 of the tensioning rail 1 is rotating about the center of rotation 2, thereby tensioning the timing chain 3. In FIG. 1 the support body 4 will rotate counterclockwise about the center of rotation 2 as soon as increased pressures are exerted via the tensioning piston 11 on the projection 6 and the pressing region 5 integrated therewith.

The same reference numerals as in FIG. 1 are used in FIGS. 2 and 3 if the same components are concerned.

The sturdy configuration of the projection 6, with the guide channel section 8 bridging the timing chain 3, which guide channel section comprises the pressing region 5, can particularly clearly be seen in these FIGS. 2 and 3. Likewise, the truss-like design of the outside of the support body 4, namely from the concave region of the support body 4 up and into the region of the timing chain resting thereon above the slide lining body 10, can clearly be seen in these figures. The slide lining body 10 comprises a slide lining on the surface.

The mode of operation of the invention shall now be described in more detail.

The tensioning rail 1 is made from one piece in an injection molding process, the support body 4 comprising webs 9 forming a projection 6 that will then comprise a pressing region 5. This region also identifies the guide channel section 8 that bridges the guide channel 7. The outside of the webs 9 is strutted in the manner of a truss. Likewise, the projection 6 is strutted in the manner of a truss and comprises recesses 12. A slide lining body 10 is clipped into the guide channel 7. The timing chain 3 is then guided in the open state through the guide channel 7. Both the tensioning rail 1 and the introduced, still open, timing chain 3 are inserted into the engine and placed around the chain sprockets of the camshaft and the crankshaft. The timing chain is then closed. An installed tensioning piston 11 will then press, particularly during operation of the engine, onto the pressing region 5 and tension the timing chain 3 by deflection of the tensioning rail 1 about the center of rotation 2.

The invention claimed is:

1. A chain drive, comprising:
   a chain; and
   a tensioning rail, the tensioning rail comprising:
      a support body that is pivotable about a center of rotation and has a guide channel that slidably accepts the chain therein;
      a projection connected to the support body and formed by at least two spaced-apart webs, the at least two spaced-apart webs being connected to the support body and disposed on opposing sides of the guide channel such that the chain passes between the two spaced-apart webs; and
      a pressing region, which is adapted to be acted on with pressure by a tensioning piston, the pressing region being connected to the at least two spaced-apart webs such that the pressing region bridges the chain along at least a portion of the guide channel to define an enclosed guide channel section that surrounds the chain, wherein the chain extends through the enclosed guide section, and
   wherein the guide channel of the support body and the projection enclose the chain on four sides at least along a portion of the guide channel, and wherein the pressing region is formed in one piece with the support body such that the chain is threaded in an open state through the enclosed guide channel when the chain is assembled with the tensioning rail.

2. The chain drive according to claim 1, wherein the pressing region is arranged in a tensioning rail half that is remote from the center of rotation.

3. The chain drive according to claim 2, wherein the pressing region is arranged in a tensioning rail third that is remote from the center of rotation.

4. The chain drive according to claim 1, wherein the pressing region is reinforced.

5. The chain drive according to claim 1, wherein the pressing region is configured as a projection of the tensioning rail.

6. The chain drive according to claim 5, wherein the projection comprises recesses on a sidewall, wherein the recesses are oriented in parallel with a plane in which the chain is running when in use.

7. The chain drive according to claim 6, wherein the recesses are provided in a direction of a pressure, which can be applied by the tensioning piston.

8. The chain drive according to claim 1, further comprising a slide lining body, wherein the slide lining body is arranged in the guide channel, and wherein the chain is configured to slide onto the slide lining body.

9. The chain drive according to claim 8, wherein the slide lining body is connected onto ends of the tensioning rail.

10. The chain drive according to claim 8, wherein a shortest distance of an end of the pressing region at a tensioning piston side thereof extending from a slide lining body surface is about ⅛ to ⅜ of the distance between the end of the pressing region at the tensioning piston side and the center of rotation.

11. The chain drive according to claim 10, wherein the shortest distance of the end of the pressing region at the tensioning piston side is about ¼ of the distance between the end of the pressing region at the tensioning piston side and the center of rotation.

12. The chain drive according to claim 1, wherein a shortest distance of an end of the pressing region at the tensioning piston side from a slide lining body surface is between about six and eight times a thickness of the slide lining body.

13. The chain drive according to claim 12, wherein the shortest distance of the end of the pressing region at the tensioning piston side from the slide lining body surface is seven times the thickness of the slide lining body.

14. The chain drive according to claim 1, wherein a height of the guide channel in a region of the closed guide channel section is between 1.2 and 2.1 times a width of the guide channel.

15. The chain drive according to claim 14, wherein the height of the guide channel in the region of the closed guide channel is about 1.8 times the width of the guide channel.

16. The chain drive according to claim 1, wherein a distance of about 0.2 to 1.0 times a guide channel width exists between an upper side of the chain that is insertable into the guide channel, which upper side is remote from a surface of the slide lining body, and a lower side of the guide channel section, which lower side bridges the guide channel and which is close to the surface of the slide lining body.

17. The chain drive according to claim 1, wherein the pressing region comprises a steel plating that is integrally and firmly connected to the support body.

18. The chain drive according to claim 1, wherein the chain is guided in an open state through the guide channel.

19. A tensioning rail for a chain drive, comprising:
a support body that is pivotable about a center of rotation and that includes:
a guide channel that is adapted to slidably accept a chain therewithin,
a projection formed by at least two spaced-apart webs, the at least two spaced-apart webs being disposed on opposing sides of the guide channel such that the chain passes between the two spaced-apart webs; and
a pressing region, which is adapted to be acted on with pressure by a tensioning piston, the pressing region being connected to the at least two spaced-apart webs such that the pressing region bridges the chain at least along a portion of the guide channel to define a peripherally enclosed guide channel section that surrounds the chain;
wherein the chain extends through the peripherally enclosed guide channel section, and wherein the guide channel and the projection enclose the chain on four sides along the peripherally enclosed guide channel section such that the chain must be threaded in an opened state through the enclosed guide channel when the chain is assembled with the tensioning rail.

* * * * *